United States Patent [19]

Hopkinson

[11] 4,256,956
[45] Mar. 17, 1981

[54] CODE IDENTIFICATION APPARATUS

[75] Inventor: Dennis Hopkinson, Newport, Australia

[73] Assignee: Access Control Systems Pty. Ltd., Australia

[21] Appl. No.: 119,333

[22] Filed: Feb. 7, 1980

[30] Foreign Application Priority Data

Mar. 2, 1979 [AU] Australia ............................. PD7882

[51] Int. Cl.$^3$ ........................ G06K 7/08; G06K 7/016
[52] U.S. Cl. .................................. 235/449; 235/474
[58] Field of Search ............... 235/449, 450, 456, 466, 235/482, 493, 474

[56] References Cited

U.S. PATENT DOCUMENTS

| | | | |
|---|---|---|---|
| 3,419,710 | 12/1968 | Mathews, Jr. et al. ............... | 235/482 |
| 3,953,712 | 4/1976 | Horvath ............................... | 235/449 |
| 3,963,901 | 6/1976 | Gevas ................................... | 235/449 |
| 4,134,539 | 1/1979 | Hopkinson ........................... | 235/493 |
| 4,213,039 | 7/1980 | Schasser .............................. | 235/449 |

Primary Examiner—Daryl W. Cook
Attorney, Agent, or Firm—Biebel, French & Nauman

[57] ABSTRACT

Code identification apparatus in which a magnetically coded key or like instrument is inserted into a reader which reads the code on the key. The reader has a guideway to receive the key and, adjacent the guideway, a row of code sensors disposed such that as the key is inserted into the guideway, rows of code locations on the key successively pass the row of code sensors. The reader incorporates signal processing circuitry which determines when there is an output signal from any one or more of the code sensors as a measure of time intervals during which successive rows of code locations are passing the sensors. The signals are accumulated during those time intervals and the accumulated signals registered at their conclusion.

9 Claims, 7 Drawing Figures

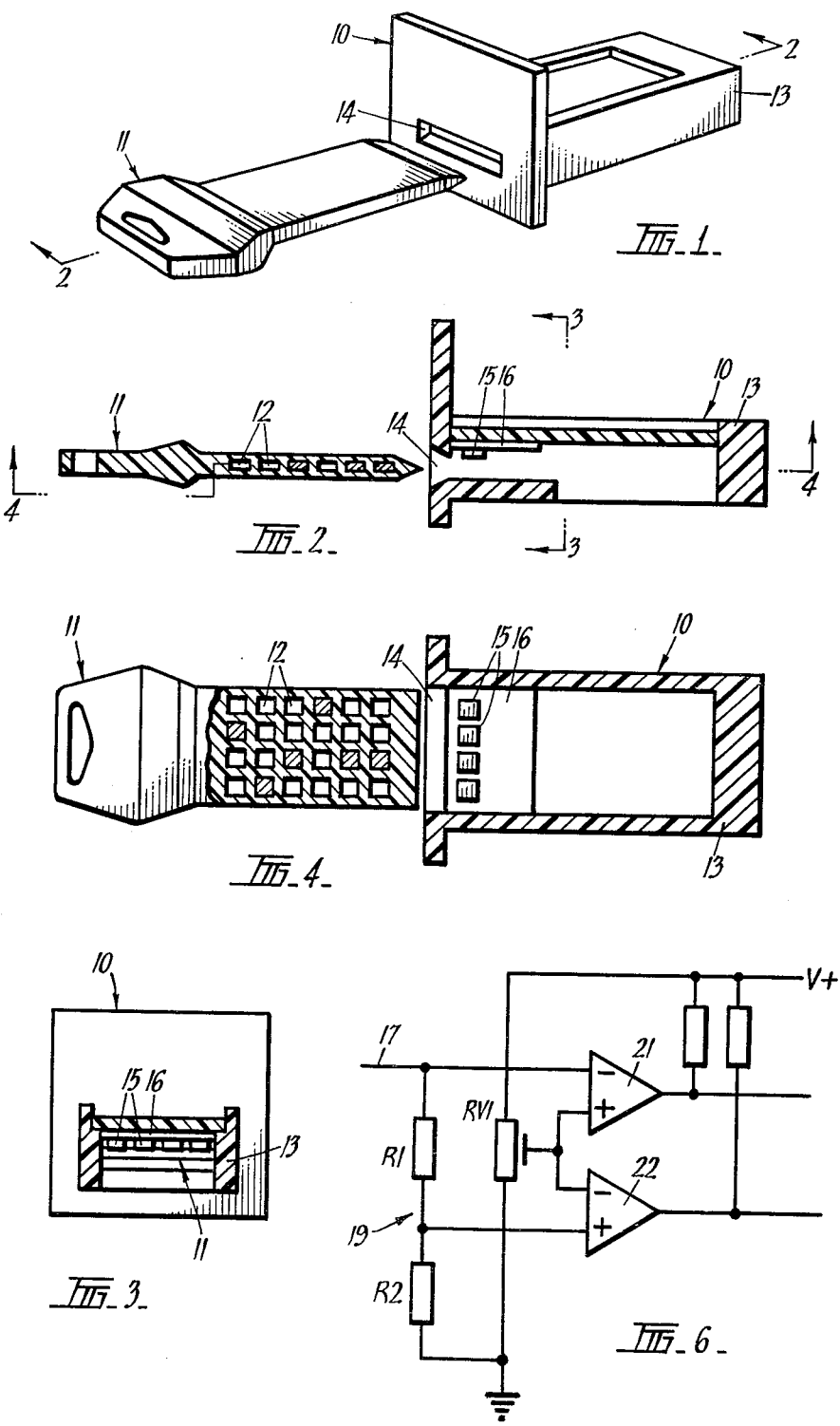

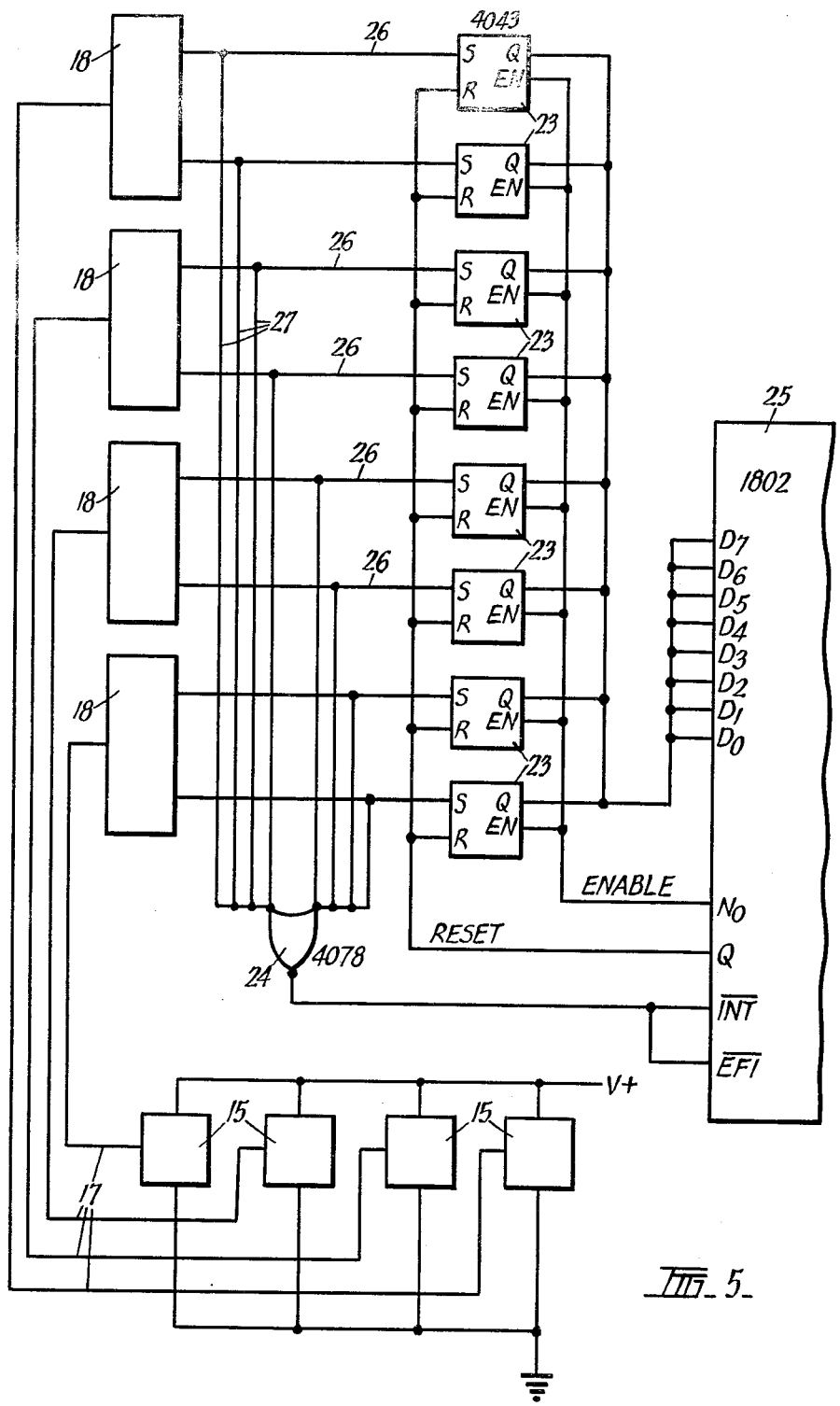
FIG_5

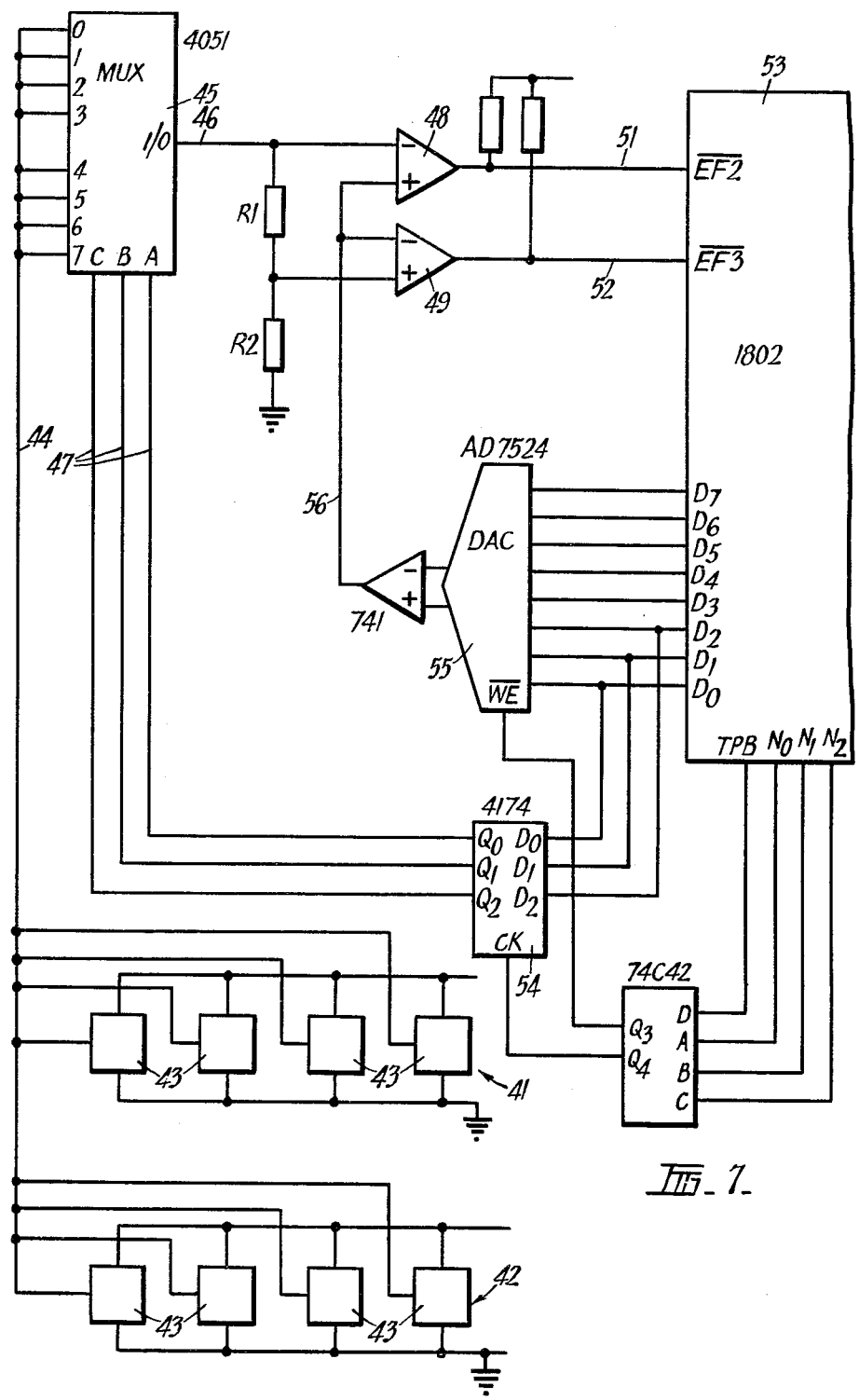
_Fig. 7_

CODE IDENTIFICATION APPARATUS

BACKGROUND OF THE INVENTION

This invention relates to code identification apparatus of the type in which an instrument such as a key or card having a code recorded on it is submitted to a reader which reads the recorded code. Apparatus of this type may be used in locking systems and various accounting and credit control facilities. In the case of a locking system the reader will control the condition of a lock and the coded instrument would normally be in the form of a key which is inserted into the reader. In the case of credit control systems, the instrument would usually be in the form of a coded card.

The invention has particular, but not exclusive, application to apparatus in which the instrument is magnetically coded, for example by the inclusion of small magnets at selected locations within a non-magnetic body of the instrument. More specifically, it provides apparatus which is a logical development of the apparatus disclosed in U.S. Pat. No. 4,134,539.

U.S. Pat. No. 4,134,539 discloses an apparatus in which the code data on the instrument is read off row by row during key entry in synchronism with a strobe generated by the interception of light beams by the instrument which determines the position of the instrument. One problem encountered with this apparatus is that it is difficult to completely weatherproof since the light beams can be affected by dirt and dust and the focal length of the light devices can be changed by water introduced into the reader, for example by wet keys or cards. Moreover, due to the need for the light beams to be switched in sequence, a large number of wires are required between the reader and its control logic. The present invention provides an alternative kind of apparatus which avoids these problems.

SUMMARY OF THE INVENTION

According to the invention there is provided a code identification apparatus comprising a coded instrument having successive rows of code locations and a reader to which to apply the instrument, said reader comprising:

a body defining an instrument guideway along which to move the instrument with said rows of code locations transverse to the direction of movement of the instrument;

a row of code sensors spaced transversely across the guideway such that on movement of the instrument along the guideway the rows of code locations on the instrument will successively pass the row of code sensors with one code location of each row registering with one of the code sensors, the code sensors being effective to produce output signals indicative of code information at the code locations as those code locations pass the code sensors; and signal processing means to receive output signals from all of said code sensors, to determine when there is an output signal from any one or more of said code sensors as a measure of time intervals during which successive rows of code locations are passing the code sensors, to accumulate code sensor output signals received during said time intervals, and to register the accumulated signals on the conclusion of each of said time intervals.

The instrument may be magnetically coded by means of inclusion of permanent magnets in a non-magnetic body of the instrument at selected ones of said code locations.

The code sensors may comprise a series of Hall Effect devices and associated ternary to binary comparator circuits to convert the outputs of the Hall Effect devices to binary output signals.

In one arrangement according to the invention the signal processing means is operative to determine when there is an output signal from any one or more of said code sensors by continuously logically ORing all individual output signals from said code sensors whereby to derive OR signals indicative to said time intervals.

In an alternative arrangement, the signal processing means is operative repeatedly to scan the outputs of the code sensors in sequence, to examine at the conclusion of each scan sequence what signals were received during that scan sequence and to accumulate signals received during the time intervals when at least one signal is received during each scan sequence.

BRIEF DESCRIPTION OF THE DRAWINGS

In order that the invention may be more fully explained one particular embodiment will be described in some detail with reference to the accompanying drawings in which:

FIG. 1 is a perspective view of a magnetically coded key and a code reader constructed in accordance with the invention;

FIG. 2 is a cross-section generally on the line 2—2 in FIG. 1;

FIG. 3 is a cross-section on the line 3—3 in FIG. 2;

FIG. 4 is a cross-section on the line 4—4 in FIG. 2;

FIG. 5 is a block circuit diagram of electronic components of the reader;

FIG. 6 shows detailed circuitry of ternary to binary comparators incorporated in the reader; and FIG. 7 is a block circuit diagram of the electronic components in an alternative type of code reader also constructed in accordance with the invention.

DESCRIPTION OF PREFERRED EMBODIMENTS

FIGS. 1 to 4 show a reader 10 and a magnetically coded instrument 11. The instrument is formed as a plastic key-like device containing a matrix of hollow cells 12 into which may be fixed magnets whose position and direction represent certain codes.

Reader 10 comprises a body 13 having a slot 14 to receive the coded key and four Hall Effect devices 15 mounted on a printed circuit board 16 within the slot such that when the key is inserted into the slot, the magnets in the key pass row-by-row under the Hall Effect devices.

FIG. 5 shows a circuit diagram of the Hall Effect devices 15 in the reader with their outputs 17 connected to four blocks 18 which are ternary to binary comparators, the circuitry for which is shown in detail in FIG. 6.

In each ternary to binary comparator 18, the analogue output 17 from a Hall Effect device which may be a Honeywell type 634SS2, is applied to the top of a potential divider 19 formed by resistors R1, R2 and also to the inverting input of a first comparator 21. The junction of the potential divider is applied to the non-inverting input of a second comparator 22 and the potentiometer RV1 is set so that the other inputs of the comparators are held at the same voltage as would be present at the midpoint of R1. Under these conditions the outputs of both comparators, which may be National Semi-conductors type LM324, are both held at Logic 0.

When a magnet passes under a Hall Effect device, the output of that device either rises or falls from its normal level depending upon which way the magnet is facing with respect to the Hall Effect device. If the voltage rises, the non-inverting input of comparator 22 eventually rises above the voltage set by RV1 and its output goes to a logic 1. If the voltage falls due to the magnet facing the opposite way, the inverting input of comparator 21 eventually falls below the voltage set by RV1 and its output goes to a logic 1. Thus, for any one magnet position in the key, the comparator outputs are No magnet=00
Magnet North=01
Magnet South=10

The eight outputs from the four ternary to binary comparators are received by a signal processing logic circuit formed as an assembly of conventional logic elements comprising an accumulating network of eight RS flip-flops 23, an OR gate 24 (type 4078) and a microprocessor 25, which may be an RCA type 1802.

Flip-flops 23 are connected to the outputs of ternary to binary comparators 18 by eight input lines 26 and these are connected to input lines 27 to the OR gate 24. Gate 24 produces a common OR signal which is fed to microprocessor 25 via line 28. When a magnet or magnets approach the Hall Effect devices and one of the comparators 18 gives an output, the common OR output goes to a logic 0 and that comparator output is recorded by the flip-flop section. At the same time an interrupt to the microprocessor $\overline{INT}$ input instructs the microprocessor to test the external flag input $\overline{EF1}$. Any further outputs from the comparators arriving after the first output are also recorded by the flip-flops.

As the magnets recede from the Hall Effect devices, the comparator outputs all return to logical 0 and the common OR output goes high. At this time, the microprocessor branches because $\overline{EF1}$ has gone high and the program causes the flip-flop contents to be gated into the microprocessor which then resets the flip-flops by causing its Q output to go high and then low. The flip-flops are then ready to accept a new row of data.

The logical accumulation of the Hall Effect device outputs avoids any missed codes due to differences in Hall Effect device sensitivity, magnet strengths and mechanical variations and therefore, providing that there is at least one magnet anywhere in the row and facing either north or south with respect to the Hall Effect device, the complete data pattern of the row will be recorded.

It will be appreciated that the individual outputs derived from the Hall Effect devices may arrive at different times and may have varying magnitudes because of differing sensitivities, magnet strengths, etc. Moreover, the key might be slightly misaligned and may be inserted at various speeds. However, the common OR signal is initiated when any one or more of the incoming signals rises above a certain value and continues until the last signal has receded. The common OR signal is thus truly indicative of a time interval during which a row of key magnets is passing the Hall Effect devices. The accumulating network of flip-flops ensures that any output signal received during this time interval is recorded and included in the 8-bit word transmitted to the microprocessor at the conclusion of that interval.

From the above it will be appreciated that provided there is at least one bit of information in each row, the code data can be read from the key without any need to establish the absolute position of the key. Thus there is no need for light beams, position switches and the like and the data pattern does not need to contain positional information in each row, although the last row may contain data which indicates the end of that particular code message. The elimination of light beams or other position sensors increases the reliability by reducing the number of parts which could fail and the reduction in the number of connections between the reader and its control logic further increases the reliability, since interconnections are the largest potential source of failure in any electronic system. Another advantage is that there is no necessity to change the configuration of the reader to accommodate keys having different numbers of rows of data, it is only necessary to preset the logic to expect a given number of rows.

FIG. 7 shows a circuit diagram for an alternative embodiment of the invention in which the reader is interrogated by a microprocessor system controlled by appropriate software. This system has the advantage of requiring less hardware than the arrangement shown in FIGS. 1 to 5. Moreover, by regularly taking samples of standing Hall Effect voltage outputs, the system can be made to operate over a higher temperature range than that of the previous embodiment.

The circuit of FIG. 7 includes the hardware parts required to interrogate two readers using a microprocessor. The two readers are indicated generally as 41, 42 and each is provided with four Hall Effect devices 43. The outputs of the eight Hall Effect devices 43 are connected by a common line 44 to an analogue multi-plexer (MUX) 45, which may be type 4051. Any one output of the Hall Effect devices 43 can be connected to the MUX output 46 by setting up the appropriate octal code on selector lines 47. The multiplexer output is applied to the top of a potential divider constituted by resistors R1, R2 and also to the inverting input of a first comparator 48. The junction of the potential divider between resistors R1, R2 is applied to the non-inverting input of a second comparator 49. The outputs of comparators 48, 49 are fed by lines 51, 52 to the $\overline{EF2}$ and $\overline{EF3}$ external flag inputs of microprocessor 53, which may be of type 1802.

The octal code for selecting a particular Hall Effect device for interrogation is provided by the $D_0$, $D_1$ and $D_2$ outputs of the microprocessor. This signal is fed to the octal code selector lines 47 of multiplexer 45 via a latch 54 and also to a digital to analogue convertor (DAC) 55. The octal code is stored coincident with a decoded N line No. 4 from the microprocessor via a decoder 74C42. The $D_0$–$D_7$ outputs of the microprocessor supply to the digital to analogue convertor 55 reference signals appropriate to the selected Hall Effect device such that the convertor provides an output in line 56 which maintains the voltage at the positive input of comparator 48 and the negative input of comparator 49 at the same value as is present at the midpoint of R1. This data is stored coincident with decoded N line No. 3. During an initialization sequence of the apparatus, and periodically thereafter, a program is executed to determine the appropriate reference voltage which must be produced by digital to analogue convertor 55 for each of the Hall Effect devices. This value which is different for each of the Hall Effect devices is stored in the memory of the microprocessor.

Microprocessor 53 is controlled by an interrogation program to operate as follows:

The octal code for selecting a particular Hall Effect device 43 is applied to the multiplexer selector lines 47 via latch 54. The digital to analogue convertor 55 then biases the comparators 48, 49 to a reference level appropriate to the Hall Effect device selected. If a magnet happens to be under the selected Hall Effect device 43, the multiplexer output 46 will be above or below the reference depending on the field direction of the magnet. One of the comparator outputs 51, 52 will therefore be high and the other low and these outputs are tested by branch instructions in the microprocessor. The multiplexer octal code is then incremented, and the $D_0$–$D_7$ inputs to the digital to analogue convertor changed to produce the comparator reference appropriate to the new Hall Effect device. The comparator outputs are again tested by branch instructions. By continuing this process all of the Hall Effect devices for one of the readers can be repeatedly scanned in sequence.

The microprocessor operates to carry out an accumulating OR process on the signals produced from successive scan sequences. The signals derived from a first scan sequence are held in a temporary store and are subsequently ORed with the signals received from the next scan sequence to produce a first OR result which replaces the signals held in temporary store. At the end of each succeeding scan sequence the signals in the store are logically ORed with the signals produced by the last scan sequence and the new OR result is committed to the store. Initially, when there are no output signals from the Hall Effect devices, there will be no accumulation of signals. However, as soon as there is an output signal from any one or more of the Hall Effect devices there will be a continuous accumulation of such signals in the temporary store of the microprocessor. This process continues until such time as a scan produces a zero result indicating that all of the magnets present in the respective code row have passed under the Hall Effect devices. The microprocessor then operates to clear the accumulated data from the temporary store into a storage register, and to decrement a row counter. Scanning then continues in order to check the arrival of another row of magnets. After the required number of rows of magnets have passed beneath the Hall Effect devices, the row counter is decremented to zero and the scanning process ceases in order to allow manipulation of the data assembled in the storage register.

The logical ORing process carried out on the data of the successive scans eliminates the effects of varying sensitivities of the Hall Effect device, varying magnetic strengths and mechanical tolerances and, provided that there is at least one magnet anywhere in the row the complete data operation of the row will be registered.

A program to perform the above operations is set out below. This program is designed for the circuit shown in FIG. 7 incorporating an RCA 1802 microprocessor and using the $\overline{EF2}$ and $\overline{EF3}$ external flag inputs for checking the comparators. It will be appreciated, however, that other types of microprocessors can be used and the two bit comparator data can be gated on to the bus of the microprocessor or into a port if the particular processor to be used does not possess flag inputs.

| | | | | |
|---|---|---|---|---|
| 0227 | AA | PLO | RA | |
| 0228 | F8 17 | LDI | KEYTO | |
| 022A | BC | PHI | RC | |

-continued

| | | | | |
|---|---|---|---|---|
| 022B | F8 00 | LDI | 0 | |
| 022D | AC | PLO | RC | |
| 022E | 9B 1 | GHI | RB | |
| 022F | FA 80 | ANI | #80 | "SWITCH" |
| 0231 | 3A 81 | BNZ | 9F | |
| 0233 | F8 00 | LDI | 0 | |
| 0235 | 5A | STR | RA | CLEAR RESULT BYTE |
| 0236 | 9D 2 | GHI | RD | |
| 0237 | A7 | PLO | R7 | RESET |
| 0238 | 1A | INC | RA | |
| 0239 | F8 00 | LDI | 0 | |
| 023B | 5A | STR | RA | |
| 023C | E7 | SEX | R7 | |
| 023D | 64 | OUT | MUX | |
| 023E | 63 | OUT | DAC | |
| 023F | F8 01 | LDI | 1 | |
| 0241 | 3E 46 | BN3 | 3F | +COMP IS HI CODE = 01 |
| 0243 | 35 47 | B2 | 4F | −COMP IS LO CODE = 00 |
| 0245 | FE | SHL | | *2 CODE = 10 |
| 0246 | 5A 3 | STR | RA | |
| 0247 | 2C 4 | DEC | RC | 16 BIT COUNTER |
| 0248 | 9C | GHI | RC | |
| 0249 | 32 12 | BZ | ABORT | |
| 024B | 64 | OUT | MUX | |
| 024C | 63 | OUT | DAC | |
| 024D | F8 04 | LDI | 4 | BCT 3 |
| 024F | 3E 54 | BN3 | 3F | +COMP IS HI CODE = 01 |
| 0251 | 35 58 | B2 | 4F | −COMP IS LO CODE = 00 |
| 0253 | FE | SHL | | *2 CODE = 10 |
| 0254 | EA 3 | SEX | RA | FOR OR'ING |
| 0255 | F1 | OR | | |
| 0256 | 5A | STR | RA | |
| 0257 | E7 | SEX | R7 | FOR OUTPUT |
| 0258 | 64 4 | OUT | MUX | |
| 0259 | 63 | OUT | DAC | |
| 025A | F8 10 | LDI | #10 | BCT 3 2 |
| 025C | 3E 61 | BN3 | 3F | +COMP IS HI CODE = 01. |
| 025E | 35 65 | B2 | 4F | −COMP IS HO CODE = 00 |
| 0260 | FE | SHL | | *2 CODE = 10 |
| 0261 | EA 3 | SEX | RA | FOR OR'ING |
| 0262 | F1 | OR | | |
| 0263 | 5A | STR | RA | |
| 0264 | E7 | SEX | R7 | FOR OUTPUT |
| 0265 | 64 4 | OUT | MUX | |
| 0266 | 63 | OUT | DAC | |
| 0267 | F8 40 | LDI | #40 | BCT 3 3 |
| 0269 | 3E 6E | BN3 | 3F | +COMP IS HI CODE = 01. |
| 026B | 35 71 | B2 | 4F | −COMP IS LO CODE = 00 |
| 026D | FE | SHL | | *2 CODE = 10 |
| 026E | EA 3 | SEX | RA | FOR OR'ING |
| 026F | F1 | OR | | THIS IS NEW RESULT IF MAGNET |
| 0270 | 38 | SKP | | −SO SKIP NEXT INSTR. |
| 0271 | 0A 4 | LDN | RA | GET RESULT FROM PREVIOUS HED |
| 0272 | B9 | PHI | R9 | TEMP STORE |
| 0273 | 2A | DEC | RA | POINTS TO OLD RESULT |
| 0274 | EA | SEX | RA | |
| 0275 | F7 | SM | | SUBTRACT OLD RESULT |
| 0276 | 3B 7C | BL | 8F | |
| 0278 | 99 | GHI | R9 | ELSE GET NEW RESULT |
| 0279 | 5A | STR | RA | − & STORE IT |
| 027A | 30 36 | BR | 2B | |
| 027C | 99 8 | GHI | R9 | |
| 027D | 32 81 | BZ | 9F | IF READING ZERO SKIP |
| 027F | 30 36 | BR | 2B | |
| 0281 | 29 9 | DEC | R9 | −AND DECREMENT ROW COUNTER |
| 0282 | 1A | INC | RA | POINT TO NEXT RESULT BYTE |
| 0283 | 89 | GLO | R9 | |
| 0284 | 3A 2E | BNZ | 1B | DO NEXT ROW IF NOT ZERO |
| 0286 | 30 88 | BR | KEYNM | CONTINUE PROCESSING KEY |

I claim:

1. Code identification apparatus comprising a coded instrument having successive rows of code locations and a reader to which to apply the instrument, said reader comprising:
- a body defining an instrument guideway along which to move the instrument with said rows of code locations transverse to the direction of movement of the instrument;
- a row of code sensors spaced transversely across the guideway such that on movement of the instrument along the guideway the rows of code locations on the instrument will successively pass the row of code sensors with one code location of each row registering with one of the code sensors, the code sensors being effective to produce output signals indicative of code information at the code locations as those code locations pass the code sensors; and
- signal processing means to receive output signals from all of said code sensors, to determine when there is an output signal from any one or more of said code sensors as a measure of time intervals during which successive rows of code locations are passing the code sensors, to accumulate code sensor output signals received during said time intervals, and to register the accumulated signals on the conclusion of each of said time intervals.

2. Code identification apparatus as claimed in claim 1, wherein the instrument is magnetically coded by means of magnetized instrument portions disposed at selected ones of code locations.

3. Code identification apparatus as claimed in claim 2, wherein the code sensors comprise a series of Hall Effect devices.

4. Code identification apparatus as claimed in claim 2, wherein the code sensors further comprise ternary to binary comparators to convert outputs of the Hall Effect devices from ternary to binary output signals.

5. Code identification apparatus as claimed in claim 1, wherein the signal processing means is operative to determine when there is an output signal from any one or more of said code sensors by continuously logically ORing all individual output signals from said code sensors whereby to derive OR signals indicative to said time intervals.

6. Code identification apparatus as claimed in claim 5, wherein the signal processing means comprises;
- a series of signal recording devices having input lines connected to the code sensors and conditionable to record signals received from the code sensors via said input lines;
- accumulated data storage means to receive and register accumulated signals from the signal recording devices;
- an OR gate which has a series of input lines connected one to each of said input lines of the signal recording devices and a single output line and which is operative to produce in said output line said logical OR signals from any signals in the input lines to the signal recording device; and
- control means to receive said logical OR signals and operative during the duration of said OR signals to condition the signal recording devices to record the signals from the code sensors and at the conclusion of each OR signal to cause transfer of the recorded signals to the accumulated data storage means.

7. Code identification apparatus as claimed in claim 6, wherein the signal recording devices comprise a series of flip-flops.

8. Code identification apparatus as claimed in claim 1, wherein the signal processing means is operative repeatedly to scan the outputs of the code sensors in sequence, to examine at the conclusion of each scan sequence what signals were received during that scan sequence and to accumulate signals received during the time intervals when at least one signal is received during each scan sequence.

9. Code identification apparatus as claimed in claim 8, wherein the signals are accumulated during each said time interval by an accumulating ORing process in which the signals of the first scan sequence are ORed with the signals of the second scan sequence to derive a first OR result, the signals of the third scan sequence are ORed with the first OR result to derive a second OR result, the signals of the fourth scan sequence are ORed with the second OR result and so on until one scan sequence shows no signals, and the last of the OR results is registered as the accumulated signals for that time interval.

* * * * *